Figure 3:
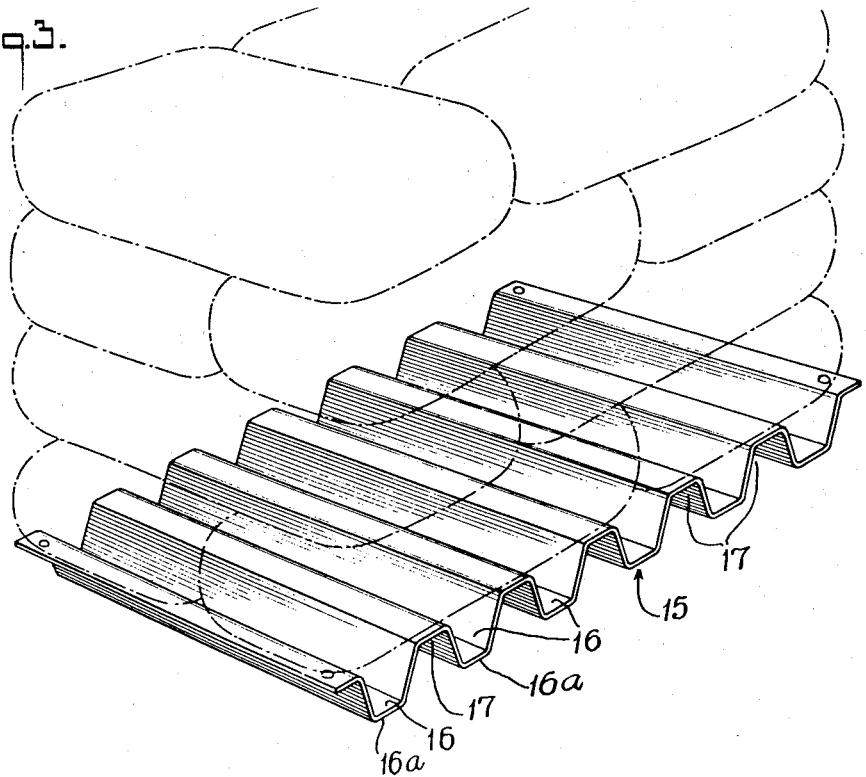

Dec. 3, 1946.  B. ULINSKI  2,412,184
PALLET
Filed May 2, 1944  2 Sheets-Sheet 1
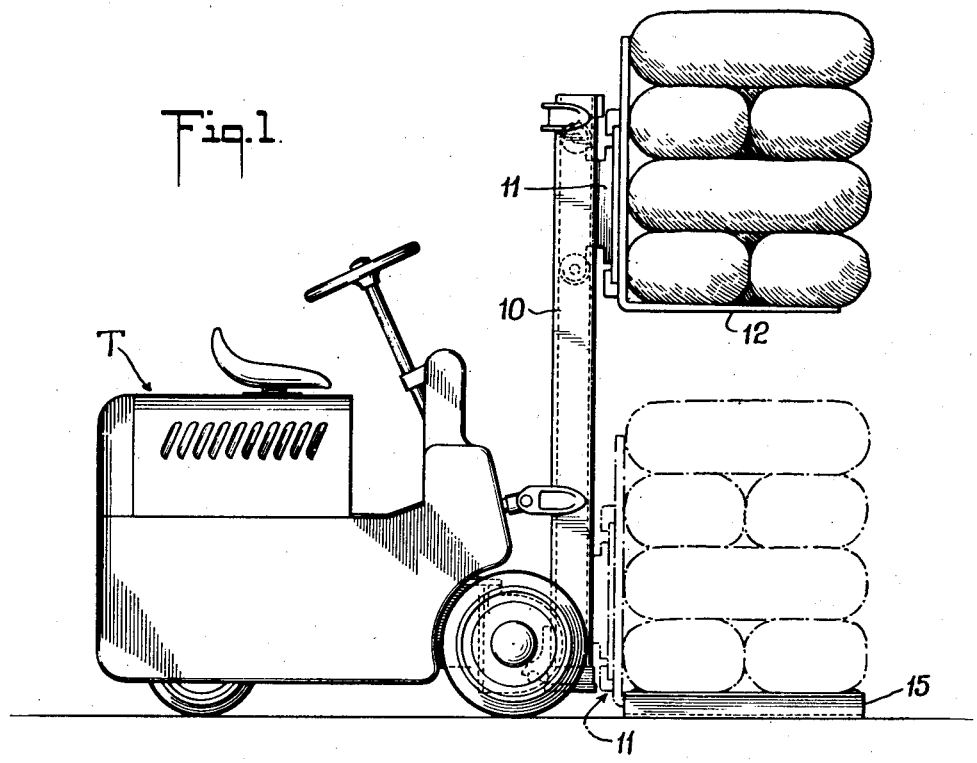
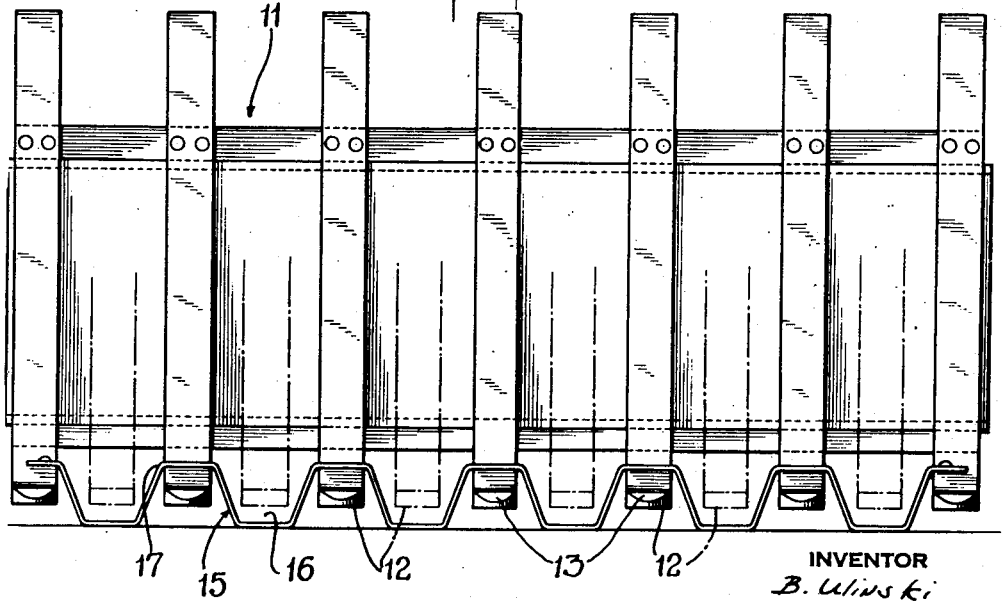
INVENTOR
B. Ulinski
BY
ATTORNEY Dec. 3, 1946.   B. ULINSKI   2,412,184
PALLET
Filed May 2, 1944   2 Sheets-Sheet 2

INVENTOR
B. Ulinski
BY
A.H. Golden
ATTORNEY

Patented Dec. 3, 1946

2,412,184

UNITED STATES PATENT OFFICE 2,412,184

PALLET

Bronislaus Ulinski, Chicago, Ill., assignor to The Yale & Towne Manufacturing Company, Stamford, Conn., a corporation of Connecticut Application May 2, 1944, Serial No. 533,760

3 Claims. (Cl. 248—120)

This invention relates to a pallet for handling material with the aid of an industrial truck.

In warehouses and factories it has become customary in recent years to handle loads of various materials by what is termed a truck and pallet or a truck and skid system. Thus, the material, whether it be in bags, packages, or merely loose, as for example tin plate, is first placed on a skid or pallet. When it is desired to transport the material, an industrial truck is moved opposite the pallet and its forks or other lifting means are inserted under the pallet. Thereafter, the forks or other lifting means of the truck are elevated and the load transported together with the pallet to any desired location. Those skilled in the art fully appreciate the operation of a system of the particular class described.

Before proceeding further with the description of my invention and its relation to the prior art, it may be well to indicate at this point that in this specification and in the claims appended I shall, for the sake of brevity, use the term "pallet" in its generic sense. Thus, by a pallet I include any device such as a skid or the like, on which a load is placed for movement by an industrial truck. Similarly, I shall use the term "forks" in its generic sense to indicate the load handling part of an industrial truck.

Where industrial loads are handled as I have outlined, there is a great savings effected in time and labor since relatively large loads may be handled swiftly and with ease. When materials are to be shipped, as by freight car, it is possible to ship the pallet and the load as a unit in the same manner as the pallet and load are moved about in a factory or warehouse. This method of shipping is quite satisfactory except as to the element of cost, it being appreciated that the pallet must be returned to the shipper to be re-used and that the freight rates on the pallets being returned must be paid. These rates may be very high in proportion to the cost of the load handled, as will be readily appreciated. Similarly, this method requires that the shipper have on hand a great many pallets and this of course requires a relatively large investment. For the several reasons indicated and various others known in the art, industry has in general adopted the method of unloading loads from pallets before stacking the loads in freight cars or other shipping mediums. The loading of freight cars therefore is generally a manual operation, and is of course relatively expensive and slow.

For many years, men skilled in the handling of materials have attempted to find some suitable manner of loading materials mechanically into a freight car and to stack those materials mechanically in the freight car, free of pallets, and thereby to eliminate the difficult and tedious manual procedure now required. One approach has been the development of a cheap pallet, and one inventor has even proposed a pallet made of paper to be therefore disposable. So far as I know, no satisfactory solution has resulted from this approach. It has also been proposed that the load be mechanically pushed off the pallet and on to the freight car floor or on to a load on the floor of the car. Thus, the patent art contains patents showing a truck that is adapted to lock a pallet against movement, while a pusher ram on the truck pushes the load off the pallet. This solution requires a special truck and special pallet equipment. Moreover, it is basically undesirable because loads may be damaged by the pushing required to overcome the friction of the pallet, as those skilled in the art will appreciate.

It is my opinion that my invention to be hereinafter described, contributes a very simple solution to the long standing problem I have thus far outlined. In brief, I have conceived a method for the handling of materials that comprises lifting a load from a pallet by the positioning of the forks of the truck between the pallet and the load. At this point it will be well to reiterate that I herein use the terms "pallet" and "forks" as I have already outlined.

More particularly, my invention comprises so relating the load to the pallet that openings are formed between the pallet and the load when the load is on the pallet, into which openings forks may be inserted for elevating the load from the pallet. The pallet and load are of course adapted to be lifted together if the forks are inserted under the pallet.

More particularly, a feature of my invention resides in the combination of forks and a pallet whereby the forks are adapted to enter between the pallet and the load thereon to lift the load only, the forks being alternatively insertible in such relation to the pallet as to lift the pallet and load as a unit.

A feature of my invention resides in the skid construction per se, whereby when a load is applied to the pallet, spaces remain between the pallet and the load for the insertion of the forks of the truck to lift the load relatively to the pallet. A more detailed feature of this portion of my invention resides in the construction of a pallet having a broken or corrugated load receiving surface. It is a further feature of the invention that the pallet be constructed of corrugated material, and with the forks being insertible between the peaks of the corrugations or under the said peaks, substantially for the purposes to be described and herein above outlined.

Figure 4:
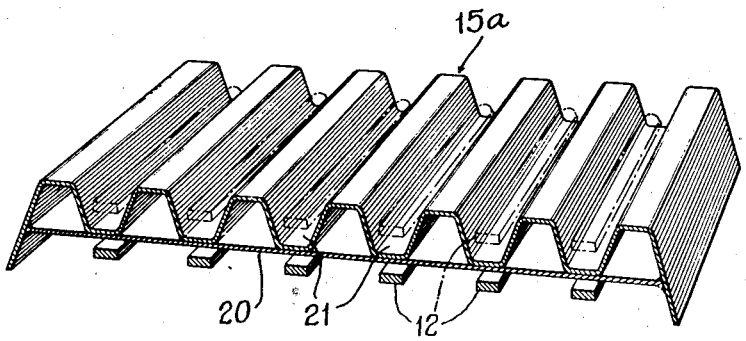

Referring now to the drawings, Fig. 1 is an elevation illustrating the manner in which my invention is utilized. Fig. 2 is a view looking from the right toward Fig. 1 but with the load not illustrated. Fig. 3 is a perspective view of a preferred form of pallet showing the load in phantom. Fig. 4 is a perspective view of a modified form of pallet.

Referring now more particularly to the drawings, a fork truck to be used as part of my invention is designated by reference letter T. It is equipped with the usual tilting uprights 10 on which is movable a load platform 11 that may be formed with a series of spaced forks 12. In the particular form of my invention illustrated in Fig. 2, there are seven of these forks, but the number may be varied in accordance with the type of load and the type of pallet. The forks 12 may be of any desired construction, but as shown in my invention, they are of the usual type equipped with beveled ends 13 and suitably secured to the load carriage 11 for movement therewith on the uprights 10. As those skilled in the art will appreciate, the forks may be shiftable, adjustable or adapted for pivotal movement relatively to the load platform 11. However, my invention is well understood and will be well appreciated from a consideration thereof with a truck having forks of the type illustrated.

A preferred form of pallet is well illustrated in Fig. 3 and is designated by reference numeral 15. It is of corrugated construction, having what I call "valleys" 16 and "peaks" 17. When a load of bags is placed on the pallet 15 as shown in Figs. 1 and 3, the valleys 16 will remain unfilled; that is, there will be spaces set up between the load and the pallet. The pallet will of course be supported on the ground or floor through contact of the under surfaces 16a of the valleys 16 with the ground. If it be desired to move both the pallet 15 and the load thereon to some selected position, the forks 12 are inserted under the peaks 17 of the pallet 15 as shown in full lines in Fig. 2. If the forks be now elevated, the pallet 15 and the load will be elevated together and the truck may then move the load to any desired position. Uprights 10 are tiltable in accordance with the practice common in the art so that the load may be safely transported and so that it may be the more easily deposited.

It may be well now to consider how my invention is utilized for the separation of the load from the pallet 15, as in the case where it is desired to stack the load in a freight car without shipping the pallets with the load. In such an event the pallet 15 may be moved with the load to a point near the door of the freight car. Forks 12 are now in their dash and dot position of Fig. 1. The forks 12 are then moved from under the peaks 17 of the pallet by backing up the truck, and are inserted into the valleys 16, and therefore between the load and the pallet. The forks will now be in their position relatively to the pallet 15 that is illustrated in dash and dot lines in Fig. 2. It is obvious that if the forks 12 are now lifted to their full line position of Fig. 1, they will lift the load off the pallet while leaving the pallet in its position illustrated in Fig. 1.

The truck may now be moved into the freight car and the load lowered by the forks onto the car floor or on a load that has already been deposited on the car floor. By suitable manipulation of the forks, such as slightly tilting the uprights 10 forwardly, the load will be caused to slip off the forks 12 and into a desired position. I am thus able to separate a load from a pallet by utilizing an industrial truck, and I am able to dispense with the costly and tedious manual operation that is now required. As an alternative, I also dispense with the complicated and costly pallets and trucks now used for the same general purpose. Those skilled in the art will readily appreciate the advantages of my invention.

In Fig. 4 I illustrate in perspective a modified form of pallet, in which the corrugated metal pallet of Fig. 3 is reinforced by a plate 20. In this pallet the forks 12 may be inserted under the plate 20 as shown in solid lines to lift the pallet 15a bodily with any load that may be placed thereon. As an alternative, the forks may be inserted in the valleys 21, and between the load and the pallet for lifting the load relatively to the pallet as I have already outlined in discussing my first modification. The pallet of Fig. 4 has the advantage that the forks 12 may be inserted between the load and pallet or under the pallet in exactly the same vertical plane. In the pallet of Figs. 2 and 3 there must be a lateral shifting of the forks in order to place them between the load and pallet or under the pallet. Those skilled in the art will readily appreciate this significance in the modification of Fig. 4.

Those skilled in the art will of course appreciate, as I have already indicated generally, that the forks, their number and shape, as well as the pallets, must be particularly designed, under the teachings of my invention, for different types of materials. Thus, for moving bars of steel, the number of forks and the shape of the pallet will be entirely different than where bags of flour are to be handled. It is important to consider that the concept of my invention is extremely novel and that once given my concept a person skilled in the art will readily develop any number of pallets or similar structures capable of utilizing the concept of my invention. It is necessary therefore, that the claims to be granted me be given an interpretation that will provide that degree of protection that is warranted by the contribution I have made to the art.

I now claim:

1. A pallet adapted to support a load comprising a structurally rigid corrugated sheet having load engaging surfaces and floor engaging surfaces, said corrugated sheet being sufficiently rigid to support and to hold a load spaced from the ground, whereby the pallet will lift the load when lift forks are inserted beneath the peaks of said sheet formed between the floor engaging surfaces thereof, and whereby a load may be lifted bodily from said pallet by a similar and parallel insertion of the lift forks between said load engaging surfaces into the valleys of said sheet and between the load and pallet.

2. A pallet adapted to support a load comprising a structurally rigid corrugated sheet having a series of parallel load engaging surfaces maintained spaced from the ground by at least two integral side extensions of said sheet formed parallel with said load engaging surfaces, said corrugated sheet being sufficiently rigid to support and to hold a load spaced from the ground, whereby the pallet will lift the load when lift forks are inserted beneath the peaks of said sheet formed on the underside of said pallet and between said integral side extensions, and whereby a load may be lifted bodily from said pallet by a similar and parallel insertion of the lift forks between said load engaging surfaces into the valleys of said sheet and between the load and pallet.

3. A pallet adapted to support a load comprising a structurally rigid corrugated sheet having a series of parallel load engaging surfaces and floor engaging surfaces, the deposit of a load on said parallel load engaging surfaces leaving "valley" like spaces between the load and pallet for the insertion of lift forks, said corrugated sheet being sufficiently rigid to support and to hold a load spaced from the ground, whereby the pallet will lift the load when lift forks are inserted beneath the peaks of said sheet formed between the floor engaging surfaces thereof, and whereby a load may be lifted bodily from said pallet by a similar and parallel insertion of the lift forks between said load engaging surfaces into the valleys of said sheet and between the load and pallet.

BRONISLAUS ULINSKI.